United States Patent Office 2,760,515
Patented Aug. 28, 1956

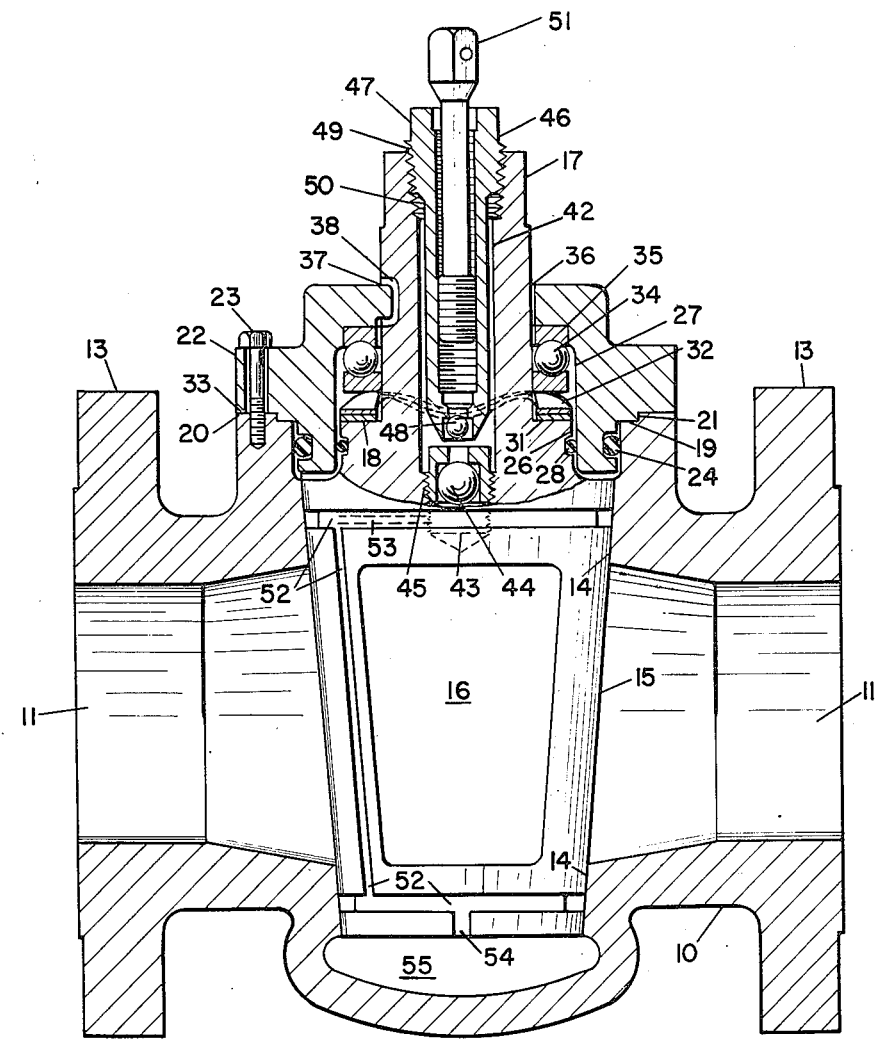

2,760,515

PLUG VALVE

Guy F. Carle, Garland, Tex.

Application May 13, 1952, Serial No. 287,511

1 Claim. (Cl. 137—246.18)

This invention pertains to plug valves. More particularly, this invention pertains to plug valves of the conical or tapered plug type in which the plug is turned by first hydraulically jacking the plug off its seat and then rotating the plug.

In valves of the tapered plug type a stem is normally connected to the large end of the frustro-conical plug. A duct through the stem is used first to transmit high pressure lubricant to grooves in the plug face for lubrication of the seat. Second, the plug is raised against a resilient packing by applying pressure through the ducts to the lubricant to which the small end of the frustro-conical plug is exposed. After the plug is raised it can be turned more easily than when it is seated. The resilient packing provides a seal around the stem and as long as it remains resilient, it returns the plug to its seat when the excess lubricant has been expended or dissipated into the flow channel through the valve. A major problem in the art has been to maintain the packing resilient and thus to get the plug to seat consistently and independently after it has been jacked up off its seat and turned.

It is an object of this invention to provide an improved plug valve. It is a more specific object of this invention to provide an improved plug valve in which the plug after being raised from its seat will be consistently seated again. A still more specific object of this invention is to provide a combination of resilient means and packing means by which the tapered plug in a plug valve seats freely after it has been jacked off its seat and turned. Still another object of this invention is to provide in a plug valve a plug which seats freely without manipulation of a packing gland and which though raised against a very high thrust force can be easily turned when the plug is raised off its seat. These and other objects of this invention will be apparent from the following description in which reference will be made to the accompanying drawing.

The drawing is a vertical cross sectional view through a plug valve in accordance with this invention, having some of the parts broken away to illustrate certain details of construction.

Referring now to the drawing, the valve comprises a body 10 of generally conventional form having a passageway 11 therethrough, the ends of the body adjacent the outer ends of passageway 11 being provided with conventional bolt flanges 13 for connecting the body into a conduit system. The body is provided with the usual downwardly tapered seat 14 which intersects passageway 11 and in which is seated a tapered plug 15 having a hole or opening 16 extending diametrically therethrough adapted to register with passageway 11 when the valve is in the open position and to close the passageway when turned through an angle of 90°. Plug 15 is provided with stem 17 of somewhat smaller diameter than the upper end of the plug, thereby forming an upwardly facing annular shoulder 18 about the base of the valve stem 17. The upper end of the valve stem may be provided with the usual squared or angular boss for application of a wrench or other tool for turning the plug in the body.

The valve body 10 projects upwardly above the tapered seat 14 forming rims 19 and 20 which have a step 21 therebetween to center a bonnet 22 with the body. Studs 23 are spaced around the bonnet to attach it to the body 11. Leakage between the bonnet and body is prevented by an O-ring seal 24.

Above the tapered plug 15 a cylindrical projction 26 is provided. This projection fits in and forms a loose fit with bore 27 of the bonnet. An O-ring seal 28 is placed between projection 26 on the plug and bore 27 of the bonnet. This seal prevents leakage of high pressure fluids in passageway 11 from flowing or leaking out of the valve around stem 17. This O-ring seal offers no resistance to vertical motion of the plug either up or down relative to the bonnet and body of the valve when the plug is jacked up and unseated for turning. A shoulder 31 between the projection 26 and stem 17 provides a base for the corrugated flat-nested springs 32. These springs force the plug down in the seat when the bonnet is applied and pulled down into place by studs 23.

The seating force applied to the plug can be varied by any of a number or combination of means. For example, the number and thickness of corrugated flat springs 32 may be adjusted as desired so that the valve can be adapted to use in conduits carrying fluids in widely different pressure ranges. Also, the spacing between rim 20 on body 10 and rim 33 on bonnet 22 may be varied to give an infinite number of adjustments as needed in the field by proper setting of the studs 23.

A low-friction bearing, preferably a ball bearing 34, is placed between the bonnet 22 and the corrugated flat spring to materially reduce the torsional force required to turn the valve. I have found that in plug valves of the conical type the life of a valve is extended appreciably if the plug is seated with a very high force. In a 4-inch valve operating at a pressure of 500 p. s. i., for example, the seating thrust is desirably in the range of several tons. Since the effective length of the various spring elements in springs 32 is necessarily short, the thrust produced by the springs when the plug is raised as much as even $\frac{1}{32}$ of an inch is increased enormously. As the thrust increases, the frictional forces also increase proportionately so that in a plug valve having a high seating thrust, the force required to turn the plug even with the plug raised is too great in large high pressure valve to permit turning without applying a large mechanical advantage. Using a low-friction bearing such as a roller or ball bearing the plug can be turned with small hand tools.

The top of low-friction bearing 34 is seated in counterbore 35 of bonnet 22. Stem 17 passes through hole 36 in the bonnet. The hole which is otherwise round may be provided with a projection 37 which cooperates with a complementary horizontal recess 38 in the exterior of stem 17 to stop rotation of the plug in the fully open and fully closed positions. This recess extends through an angle of 90° corresponding to the angle of rotation between the fully closed and the fully open position of the plug plus an additional length corresponding to the length of projection 37.

Stem 17 is provided with an axial bore 42, the lower end of which forms a lubricant reservoir 43 which is closed off from the upper portion of bore 42 by means of a downwardly opening check valve 44. This check valve is screwed into a threaded section 45 adjacent the lower end of bore 42. A tubular lubricant barrel 46 having a threaded axial bore 47 closed at its lower end by means of a second downwardly opening check valve 48 is slidably insertible in bore 42 and is provided at its upper end with external threads 49 whereby the inserted barrel may be screwed into an internally threaded section 50 provided at the upper end of bore 42. A conventional lubricant feed screw 51 is screwed into bore 47 of the lubricant barrel.

The exterior of plug 15 is provided with the usual intersecting horizontal and longitudinal lubricant channels 52 to which lubricant may be fed from reservoir 43 through a radial passage 53 providing communication between reservoir 43 and one of the channels 52. Channels 52 communicate by means of channels 54 at the lower end of the plug with the usual lubricant chamber 55 arranged in body 10 below the lower end of plug 15.

As stated above, springs 32 provide resiliency which permits the plug to be raised without raising the bonnet. These springs are constructed of any suitable spring metal and their strength will, of course, be determined in accordance with the pressure and temperature conditions to be anticipated in each case. Only a relatively limited amount of compressibility is required in springs 32. For example, axial compressibility of, say, three sixty-fourths inch will normally be sufficient to allow the plug to be raised and easily turned. Accordingly, springs 32 may be made quite stiff and the corrugations made relatively flat.

The operation of the valve is as follows: Lubricant of any conventional type will be introduced into bore 47 of barrel 46 and will be compressed by screwing down of lubricant screw 51 to thereby drive the lubricant downwardly through check valves 48 and 44 into reservoir 43 from which it will feed through passageway 53 and channels 52 into lower chamber 55 and will act in the usual manner to lubricate and seal between the tapered surfaces of seat 14 and plug 15. O-ring seals 24 and 28 effectively prevent leakage of any fluid tending to escape from the valve between the plug and the body. The greater the pressure of such fluid the tighter will be the sealing action of these O-rings.

Springs 32, which are maintained in compression, will constantly maintain downward pressure sufficient at all times to hold the plug 15 effectively seated on seat 14. At the same time, the natural resilience of springs 32 will allow the plug to lift sufficiently to permit the lubricant to flow from channels 52 between the seating surfaces of seat 14 and plug 15. Once the valve has been assembled, as illustrated, and bonnet 22 put in place to compress springs 32, the springs will continue to exert any desired compressive force at all times. That is, there is no necessity in this construction for the use of a packing gland in which the resiliency changes and causes the plug to stay in the raised position. Furthermore, there is no need for other manually operated means to adjust the downward pressure on the plug. The plug will, therefore, be subject to a relatively constant thrust which will be predetermined as indicated above by selection of a spring or springs of the proper strength or by adjustment of studs 23 so that the danger of binding or "freezing" the plug in its seat will be largely obviated. Thus, the plug will rotate freely at all times and will be effectively sealed under all operating conditions for which the valve is designed.

By providing a separate check valve 44 in the lower end of bore 42, as illustrated, it will be evident that the entire lubricant barrel 46 may be withdrawn at any time for replacement, for example, by a conventional pressure gun-type fitting which may then be screwed into threaded section 49, and this may be accomplished while the valve is under pressure, if necessary.

With the O-ring sealing arrangement of the type described, it will be evident that regardless of the length of periods between operations of the valve, the thrust on the plug will remain constant, and that the plug can be rotated at any time with a minimum force.

From the foregoing description it will be apparent that numerous modifications can be made in the illustrative embodiment without departing from the spirit of the invention. The invention should not therefore be construed to be limited to the illustrative embodiment but should be limited only by the scope of the appended claim.

I claim:

A valve comprising a body having a passageway therethrough, a tapered valve seat in said body, a valve bonnet on said body, a tapered plug movably mounted in said valve seat, a hole through said plug, said hole being adapted to register with said passageway when said valve is in an open position, a stem projecting from said plug through said bonnet for rotating said plug in said body, means including a port in said stem and said plug for introducing a fluid under pressure to a chamber in said body below said plug for jacking said plug off of said seat, an O-ring seal between said stem and said bonnet, telescoping surfaces on said body and said bonnet, an O-ring seal between said surfaces, and spring means between said bonnet and said plug resiliently urging said plug into said valve seat against the force of said fluid in said chamber whereby the thrust produced by said spring means to seat said plug may be varied by varying the spacing between said body and said bonnet.

References Cited in the file of this patent

UNITED STATES PATENTS

| | | |
|---|---|---|
| 31,793 | Evans | Mar. 26, 1861 |
| 2,012,427 | Haun | Aug. 27, 1935 |
| 2,151,098 | Greenwood | Mar. 21, 1939 |
| 2,229,120 | Nordstrom | Jan. 21, 1941 |
| 2,307,443 | Atkinson et al. | Jan. 5, 1943 |
| 2,493,966 | Hartley | Jan. 10, 1950 |
| 2,596,730 | Seinfeld | May 13, 1952 |
| 2,625,363 | Waldron | Jan. 13, 1953 |
| 2,642,257 | Mueller | June 16, 1953 |

FOREIGN PATENTS

| | | |
|---|---|---|
| 114,541 | Switzerland | Apr. 1, 1926 |